(12) United States Patent
Nakagawa

(10) Patent No.: US 7,023,717 B2
(45) Date of Patent: Apr. 4, 2006

(54) SWITCHING POWER SUPPLY APPARATUS

(75) Inventor: Shin Nakagawa, Tokyo (JP)

(73) Assignee: Fidelix Y.K., Tokyo (JP)

( * ) Notice: Subject to any disclaimer, the term of this patent is extended or adjusted under 35 U.S.C. 154(b) by 7 days.

(21) Appl. No.: 10/689,242

(22) Filed: Oct. 20, 2003

(65) Prior Publication Data
US 2004/0120163 A1    Jun. 24, 2004

Related U.S. Application Data

(63) Continuation-in-part of application No. 10/143,451, filed on May 10, 2002, now abandoned.

(51) Int. Cl.
H02M 5/42 (2006.01)
(52) U.S. Cl. ............... 363/95; 363/21.7; 323/349
(58) Field of Classification Search ............... 363/21.7, 363/21.6, 16, 20, 95, 97, 147; 323/222, 259, 323/224, 907
See application file for complete search history.

(56) References Cited

U.S. PATENT DOCUMENTS

| 4,683,528 | A | | 7/1987 | Snow et al. ............... 363/21 |
| 5,349,523 | A | | 9/1994 | Inou et al. ............... 363/97 |
| 5,434,767 | A | * | 7/1995 | Batarseh et al. ............... 363/16 |
| 5,499,184 | A | | 3/1996 | Squibb ............... 363/16 |
| 5,644,481 | A | | 7/1997 | Konishi et al. ............... 363/21.15 |
| 5,786,990 | A | | 7/1998 | Marrero ............... 363/100 |
| 6,208,531 | B1 | * | 3/2001 | Vinciarelli et al. ............... 363/21.07 |

FOREIGN PATENT DOCUMENTS

JP    06-327244    11/1994

OTHER PUBLICATIONS

Unitrode/Texas Instriument: "The UC1901 Simplifies the Problem of Isolated Feedback in Switching Regulators" Online! Retrieved from the Internet: URL: www.unitrode.com; retrieved on Dec. 12, 1999.

* cited by examiner

Primary Examiner—Rajnikant B. Patel
(74) Attorney, Agent, or Firm—Norris, McLaughlin & Marcus

(57) ABSTRACT

The present invention relates to an isolated-type switching power supply apparatus, which includes a power supply, a transformer being connected to said power supply, a switching element for switching an electric current going through a primary coil of the transformer so that energy generated on the primary side of the transformer is sent to the secondary side in accordance with the operation of the switching element. The present invention has a modulating circuit for modulating an output on the secondary side of said transformer, a transmitting rout for transmitting an output of the modulating circuit to the primary side of the transformer, a demodulating circuit for demodulating the output transferred through the transferring rout; and the controlling circuit controls the switching element in accordance with an output of the demodulating circuit and the controlling circuit is disposed on the primary side of the transformer.

10 Claims, 9 Drawing Sheets

SWITCHING POWER SUPPLY APPARATUS

This is a continuation-in-part of U.S. Ser. No. 10/143,451 filed on May 10, 2002. Now Abandoned

BACKGROUND OF THE INVENTION

1) Field of the Invention

The present invention relates to an isolated type switching power supply apparatus whereby energy generated on the primary side is transferred to the secondary side in a non-contacted manner. The present invention can suitably be used in chargers used in instruments such as shavers, cellular phones, notebook-type personal computers, cordless electric equipment, etc.

Further, the present invention can preferably applied to power supplies for use in medical equipment where a leakage electric current into human bodies must be very small, or to power supplies where it is required to supply a stable power to a high voltage portion thereof, or to supply a power for opening and closing doors of, for instance, refrigerator or car, by combining the apparatus with a storage such as batteries or electric double layer capacitor.

2) Related Art Statement

FIG. 1 is a circuit diagram showing the construction of conventional switching power supply apparatuses. As shown in FIG. 1, an output of a DC power supply 1110 is switched by a switching element 1112 via a primary coil of a transformer 1111; then transferred to the secondary side of the transformer 1111 in accordance with an operation of the switching element 1112. The output of the secondary side of the transformer 1111 is rectified by a diode 1113 and smoothed by a capacitor 1114 to be outputted. The numerical reference 1101 represents a switching control circuit for the switching element 1112 and the numerical reference 1102 represents a driving circuit for the switching element 1112.

In this apparatus, a voltage detecting circuit 1103 is provided at the downstream of the capacitor 1114 to detect the output voltage on the secondary side of the transformer 1111; the detected voltage is sent to the primary side, on the basis of which the operation of the switching element 1112 is controlled. That is to say, when the output voltage is high the ON time of the switching element 1112 is controlled to be shorter, and when the output voltage is low it is controlled to be longer, so that the output voltage of the apparatus can be kept constant.

There are three conventional routes mentioned below as a means to transfer the voltage detected in the voltage detecting circuit 1103 to the primary side of the transformer 1111.

The first route is that so-called tertiary coil is provided in the transformer 1111 and the voltage appearing at the tertiary coil is assumed as the voltage of the secondary side of the transformer; then the switching element 1112 is controlled in accordance with the variation of the voltage at the tertiary coil. In FIG. 1, the voltage appearing at the tertiary coil 1111a is assumed as the voltage at the secondary side of the transformer 1111; an output of the tertiary coil 1111a is inputted to the switching control circuit 1101 after being rectified with the diode 1115 and being smoothed with the capacitor 1116. However, in such a construction, there is a problem that the voltage on the secondary side of the transformer 1111 is not correctly reflected at the tertiary coil 1111a.

The second route is that: a PWM (Pulse Width Modulation) control circuit or a PFM (Pulse Frequency Modulation) control circuit is provided at the secondary side of the transformer and the output of the PWM or PFM control circuit is sent back to the primary side via another transformer to directly control the switching element. In FIG. 1, the output of the voltage detecting circuit 1103 is modulated by the PWM or PFM control circuit 1104; the pulse output of the circuit 1104 is sent to the driving circuit 1102 via a pulse transformer 1117, which is separately provided from the switching transformer 1111.

However, according to this construction, when the power supply 1110 is turn ON, the apparatus does not start up; therefore it is necessary to provide a pulse generating circuit 1106 on the primary side of the transformer 1111 for starting up the apparatus. Further, it is required to provide some circuit for re-starting the apparatus in a case where the switching operation is stopped due to the fact that an over current is generated on the load or the load is short-circuited.

The third route is that the output of the secondary side is transferred to the primary side via a photo-coupler. In FIG. 1, such an arrangement is shown that the output of the voltage detecting circuit 1103 is sent to the switching control circuit 1101 on the primary side via the photo-coupler 1105. However, according to this construction, it is sometimes difficult to conduct a correct controlling of the switching element because dirt adhering on the photo-coupler or the variation per hour of the photo-coupler per se causes the output of the photo-coupler 1105 to vary.

SUMMARY OF THE INVENTION

The present invention has for its purpose to provide a switching power supply apparatus where the voltage on the secondary side can correctly be reflected on the primary side, no circuit for starting-up is required and even when a photo-coupler is used to relay the output on the secondary side to the primary side a switching control can be available without being influenced by dirty adhering on the photo-coupler or the variation per hour of the photo-coupler.

The present invention further has a purpose that even when the energy appearing on the primary side is assumed to be the same as that on the secondary side, the output on the secondary side can correctly be reflected on the primary side, so that a correct switching control can be conducted.

In order to carry the purpose out, an isolated-type switching power supply apparatus according to the first invention wherein a power supply, a transformer being connected to the power supply, a switching means for switching the electric current going through the primary coil of said transformer are provided and wherein energy generated on the primary side of the transformer is sent to said secondary side in accordance with an operation of said switching means, comprising:

a modulating means for modulating an output of said secondary side of said transformer;

a transferring means for transferring an output of said secondary side of said transformer to the primary side;

a demodulating circuit for demodulating the output transferred by said transferring means; and a switching control circuit for controlling an operation of said switching means;

wherein said switching control circuit controls said switching means in accordance with an output of said demodulating circuit; and wherein said switching control circuit is provided on the primary side.

In this manner, according to the switching power supply apparatus of the first invention, an output on the secondary side of the transformer is sent to the primary side after being modulated by the modulating means, which is provided on the secondary side. Therefore, the output of the secondary side can appear on the primary side under the condition that the output of the secondary side is not apt to be influenced by switching signals, which have large energy. Further, since the switching control circuit is provided on the primary side, no pulse generating circuit for starting up the apparatus is required. Furthermore, since the output on the secondary side is sent to the primary side after being modulated, even when a photo-coupler is used as the transferring means the signal representing the output is not apt to be influenced by dirty adhering on the photo-coupler or the variation per hour of the photo-coupler itself.

As the transferring means, the switching transformer itself, which works to transfer the switching signal from the primary side to the secondary side, can be used. In addition, a photo-coupler can be preferably used, or a second transformer, which is provided separately from the switching transformer, can be also used. Furthermore, when the output on the secondary side is modulated with a high frequency, an inductor circuit being composed of an inductor on the primary side and an inductor on the secondary side can be preferably used.

Further, the switching power supply apparatus according to the first invention may be arranged such that the modulating means comprises a first modulating circuit for modulating an output on the secondary side of said transformer and a second modulating circuit for further modulating an output of said first modulating circuit, and the demodulating means comprises a first demodulating circuit for demodulating an output of said second modulating circuit which is transferred with the aid of said transferring means and a second demodulating circuit for further demodulating an output of said second demodulating circuit.

A more precise switching operation can be expected by conducting the modulation and demodulation in a doubled manner as mentioned above. It should be noted that if a high modulating frequency, i.e. 10 times or more of the switching frequency, for example, is used for modulating, this modulated signal will have the nature of radio waves. Therefore, it could be possible to easily send such modulated signal to the primary side even if the modulating circuit on the secondary side and the demodulating circuit on the primary side are separated from each other. In this case, the above-mentioned inductor circuit can be preferably used as the transferring means.

Furthermore, it may be possible to arrange such that the apparatus conducts a soft switching operation. In this case, the control of the switching element becomes more precise.

It may be also possible to have a simultaneously rectifying means using an FET on the secondary side of the transformer.

Any modulating method can be preferably used in the modulating circuit, such as amplitude modulation, frequency modulation, phase modulation, pulse width modulation, pulse frequency modulation, pulse amplitude modulation, pulse period modulation, pulse code modulation, spread spectrum modulation, quadrature modulation, or other modulation mixing the above.

The switching power supply apparatus according to the second invention, wherein a power supply, a transformer being connected to the power supply, a switching means for switching the electric current going through the primary coil of said transformer are provided and wherein energy generated on the primary side of the transformer is sent to said secondary side in accordance with an operation of said switching means, comprising:

a magnetic energy detecting means for detecting a magnetic energy of said transformer;

a switching controlling means for controlling said switching means on the basis of a variation of an energy amount which is detected by said magnetic energy detecting means, a load regulation correcting means for detecting an input electric current of the apparatus and for correcting the load regulation on the basis of the detected input electric current, and/or, a line regulation correcting means for detecting an input voltage of the apparatus and for correcting the line regulation on the basis of the detected input voltage.

In this manner, since the load regulation correcting means and/or a line regulation correcting means is/are provided, even when the input voltage is too high or the input electric current is great, a preferable switching operation can be available. Particularly, in case that the required specification is not so strict that it is not necessary to have a modulating circuit on the secondary side, or in case that the magnetic energy on the primary side of the transformer is sent to the switching control means directly or after being rectified and smoothed, a preferable switching control can be conducted by carrying out the correction of the load regulation and/or the line regulation.

The magnetic energy on the transformer can be detected by a tertiary coil provided on the primary side of the switching transformer or through a second transformer which is provided separately from the switching transformer.

The apparatus according to the second invention can also be arranged to conduct a soft-switching operation. In addition, it may be possible to provide a simultaneous rectifying means using an FET on the secondary side of the transformer.

Further, it should be noted that the input electric current for use in correcting the load regulation can be substituted by detecting a duty ratio of the switching means.

DETAILED EXPLANATION OF THE EMBODIMENTS

The detail of the embodiments of the switching power supply apparatus according to the invention will be explained, referring to the attached drawings.

Figure 1:
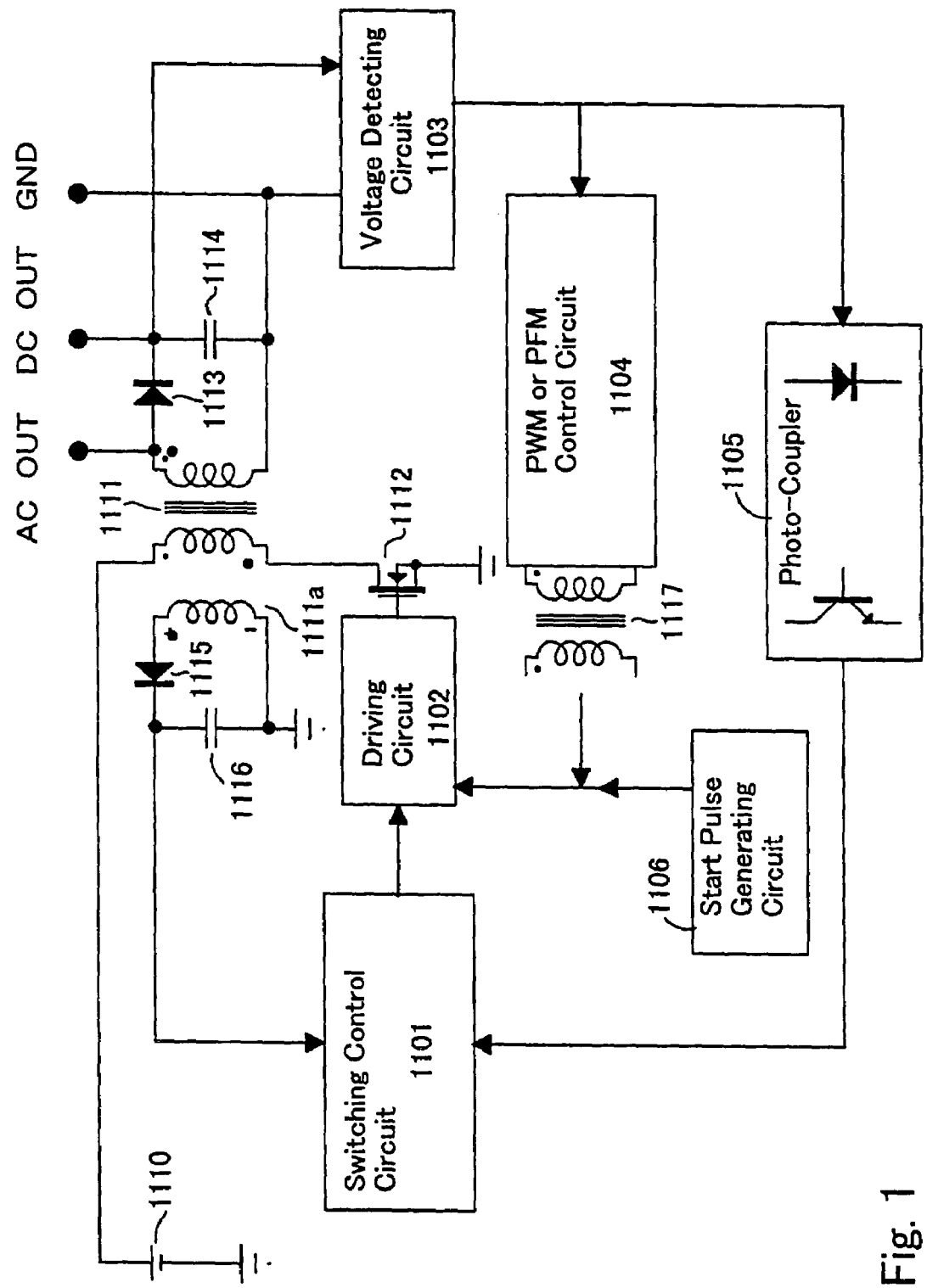
FIG. 1 is a circuit diagram showing a construction of the conventional switching power supply apparatuses.
Figure 2:
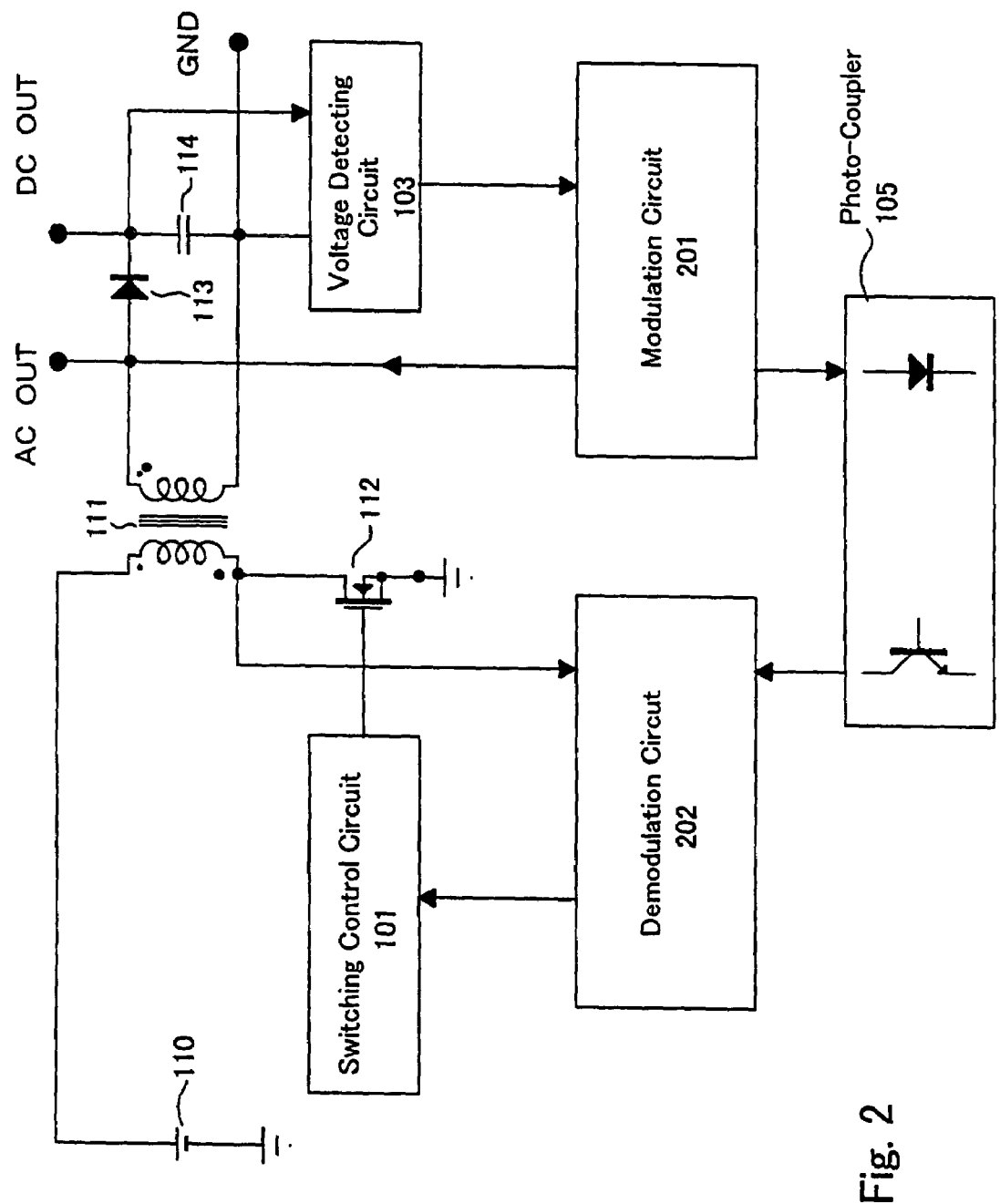
FIG. 2 is a circuit diagram depicting a construction of the first embodiment according to the present invention.

FIG. 2 is a circuit diagram showing a first embodiment of the present invention. An output of a DC power supply 110 is switched by a switching element 112 via a primary coil of a transformer 111; then transferred to the secondary side of the transformer 111 in accordance with an operation of the switching element 112. The output of the secondary side of the transformer 111 is rectified by a diode 113 and smoothed by a capacitor 114 to be outputted. The numerical reference 101 represents a switching control circuit for controlling the operation of the switching element 112.

In the first embodiment, a modulation circuit 201 is provided on the secondary side of a switching transformer 111. The output of a voltage detecting circuit 103 for detecting a voltage on the secondary side of the switching transformer 111 is modulated with a high frequency, which is different from the switching frequency, in the circuit 201 and then transferred to the primary side of the transformer 111. On the primary side of the transformer 111, a demodulation circuit 202 is provided, where the control signal sent from the modulation circuit 201 is demodulated to be inputted into the switching controlling circuit 101.

Two routes, i.e. through the switching transformer 111 (first route) or through the photo-coupler 105 (second route) can be used to transfer the modulated signal on the secondary side to the primary side of the transformer 111.

In the first route, the output signal of the modulating circuit 201 is injected from the secondary coil of the switching transformer 111 into the primary coil thereof; the output from the primary coil is then inputted into the demodulation circuit 202. Since the output signal is modulated, the signal is not apt to be interrupted by the switching signals having large energy that go from the primary side to the secondary side of the transformer 111, and therefore, the voltage on the secondary side can correctly appear on the primary side. Further, since the switching control circuit 101 for the switching element 112 is arranged on the primary side, it is not necessary in addition to provide a pulse generator for the purpose of starting the apparatus up.

The second transferring route is to use a photo coupler 105. According to the invention, the pulse output is transferred to the primary side after being modulated in the modulating circuit 201 on the secondary side; therefore, even if a photo coupler is used as the transferring means, the output on the secondary side correctly appears on the primary side under the condition that the output is not apt to be influenced by dirt adhering on the photo-coupler or time variation per hour thereof.

Figure 3:
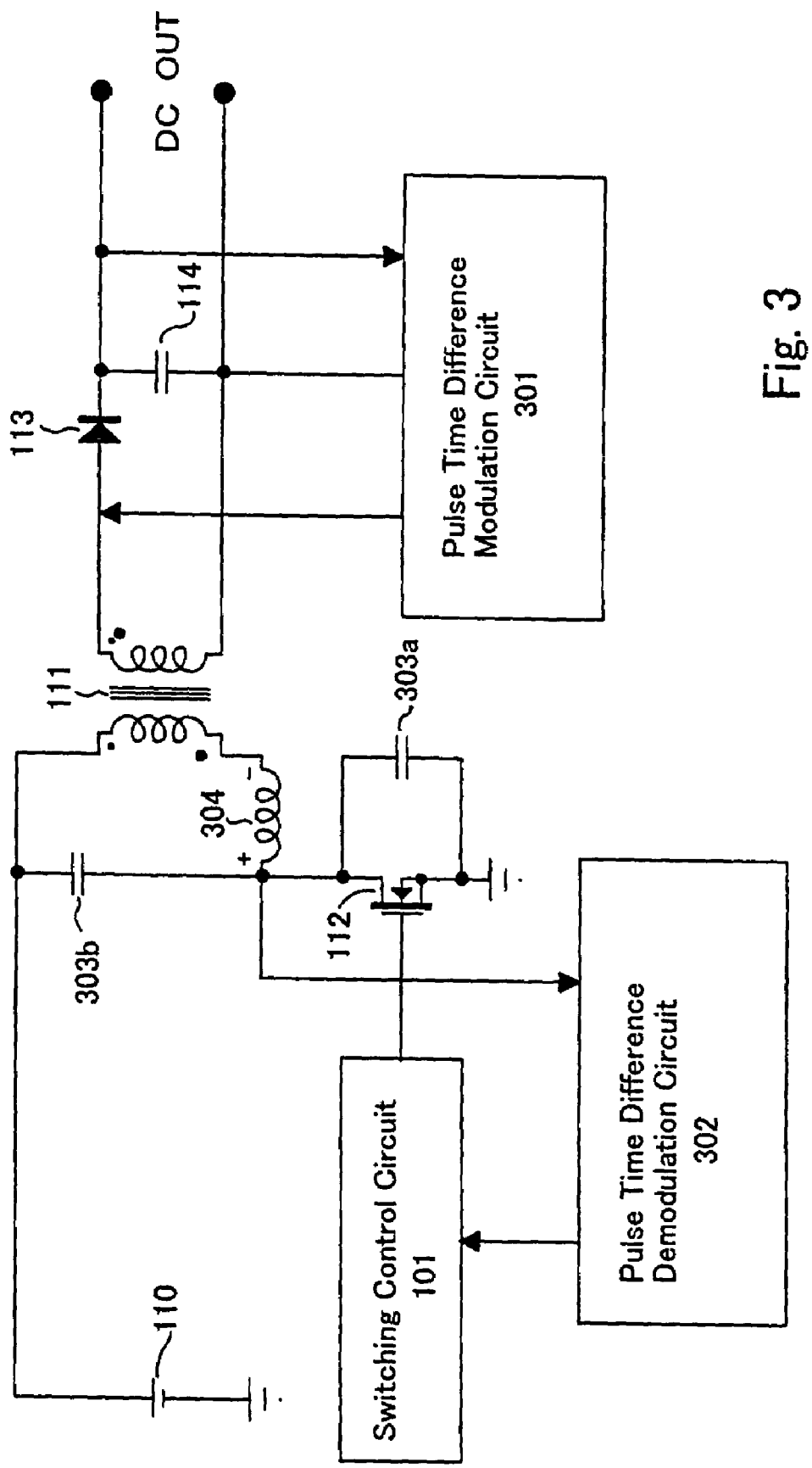
FIG. 3 is a circuit diagram depicting a construction of the second embodiment according to the present invention.

FIG. 3 is a circuit diagram depicting a construction of the second embodiment of the present invention. In the second embodiment, resonate capacitors 303a and 303b are provided on the primary side of the transformer 111 and in parallel with the switching element 112, respectively, to constitute of a fly-back voltage resonate type converter.

In isolated type power supply apparatuses, since the gap of the transformer is very wide, a leakage inductance becomes very large. A soft switching converter, as shown in FIG. 3, 4, 6, 7, or 9, where the energy stored in the leakage inductance can be collected in a capacitor, is preferably used for the isolated type power supply apparatus, because the collected leakage inductance can be effectively reused. Further, a voltage resonate type converter, which is one of zero volt switch (ZVS) converters, as shown in FIG. 3, 4, 6 or 7, can be realized by adding only one capacitor for resonating to a fly-back converter; therefore, soft switching converters can be obtained very easily with the aid of voltage-resonate type converter.

As the same as in the first embodiment, a modulation circuit 301 is provided on the secondary side and a demodulation circuit 302 is on the primary side. For the modulation circuit 301, a pulse period difference modulation circuit is used; and for the demodulation circuit 302, a pulse period difference demodulation circuit is used. The output of the pulse period difference modulation circuit 301 is injected from the secondary coil of the transformer 111 to the primary coil thereof to be inputted to the demodulation circuit 302.

This converter operates as a voltage resonate converter where it resonates for about half cycle of the OFF time of the switching element 112. In this embodiment, the OFF time of the switching element 112 is substantially fixed and then the ON time thereof is varied.

It should be noted that the energy collected in a leaked inductance 304, which is caused by the space between cores when the power is transferred from the primary side to the secondary side, can be regenerated and reused. Further, since a soft switching operation is conducted here, the modulated signal injected from the pulse period difference modulation circuit 301 is not apt to be interrupted.

The apparatus shown in FIG. 3 is constructed as a voltage resonate type fly-back converter, however, it may be possible to apply the present invention to forward converters, half bridge converters, or the others. Furthermore, an active clamp, where a sub-switch is provided in a forward converter, or a resonate-type voltage-current soft switching apparatus, is also applicable. In addition, current resonate type converters, ZVTs (Zero Voltage Transition), phase sift type converters can be considered as other soft switching power supply apparatuses.

It should be noted that modulating method with a time width signal or a time difference signal corresponding to the output on the secondary side, such as modulating with time width of continued pulses, modulating with time difference between two pulses or two pulse groups, and modulating with time difference between the ON time or the OFF time of the rectifying diode on the secondary side and the pulse or the pulse group, can be used.

Figure 4:
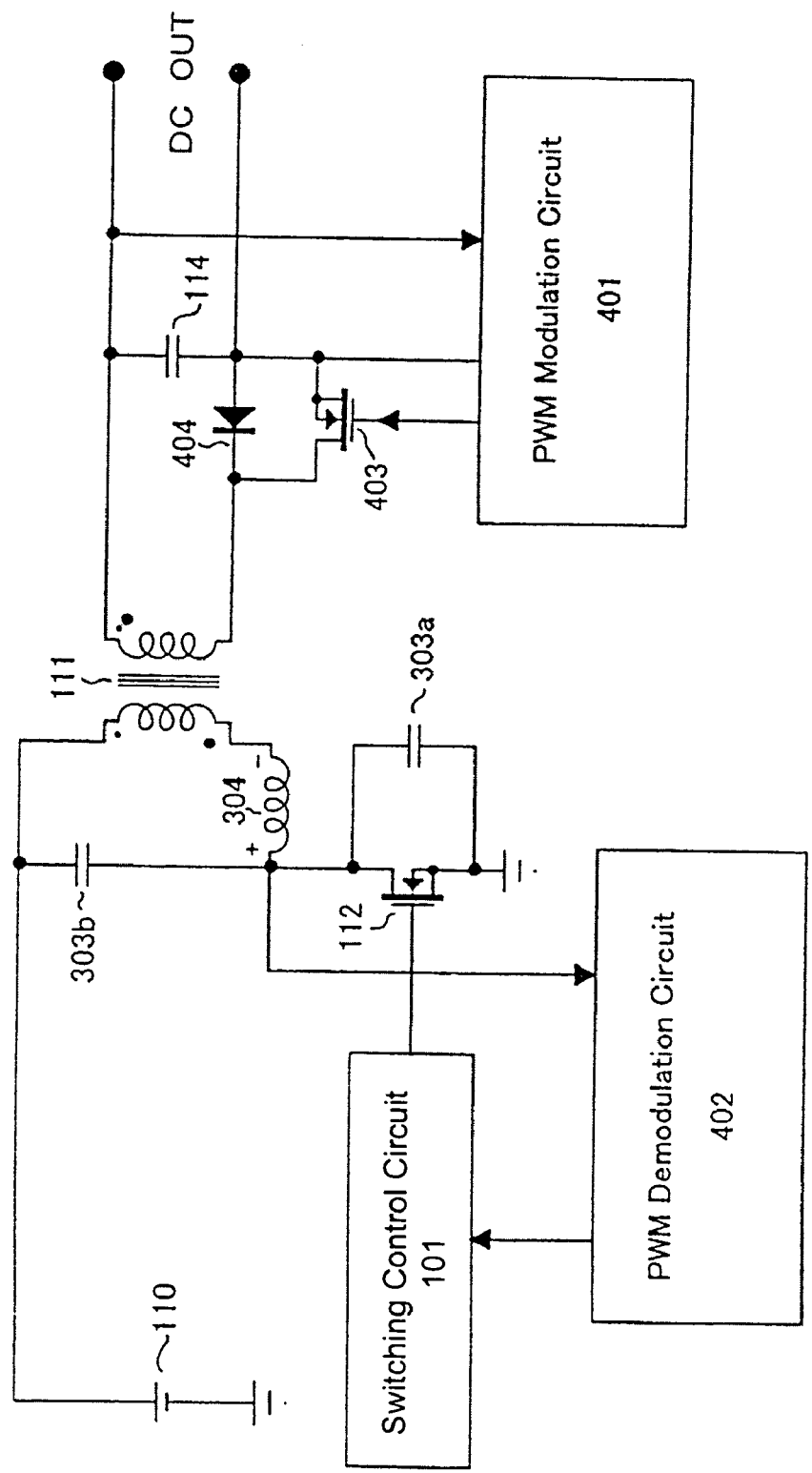
FIG. 4 is a circuit diagram depicting a construction of the third embodiment according to the present invention.

FIG. 4 is a circuit diagram illustrating the third embodiment of the present invention. In the third embodiment, an FET 403 is provided in parallel to the diode 404, which is a rectifying means on the secondary side, to conduct a simultaneous rectifying. That is to say, the output of the PWM modulation circuit 401 is sent to the primary side at a conductive timing of the gate of the FET 403.

The diode 404 is a body diode or an external diode. When the diode 404 is conducted, a gate voltage of the FET 403 is applied with a predetermined timing; during the time when the gate voltage is applied, the modulated signal generate in the PWM modulating circuit 401 is sent to the primary side. In accordance with the ON-OFF operation of the FET 403, the voltage appearing on the primary side is slightly varied, and then the little variation of the voltage is detected in the PWM demodulating circuit 402 and demodulated there to control the switching element 112. That is to say, in the normal PWM moderation, the power supply apparatus is controlled by modulating the ON-time or OFF-time of the main switch: contrary to this, in the apparatus shown in FIG. 4, the conducted time of the body diode (or the external diode) is modulated in a PWM manner and a signal for controlling the operation of the main switch is sent from the secondary side to the primary side.

The PWM modulation of the conducted time can be done during the time when the gate of the FET 403 is ON, or from the timing when the diode 404 is turned ON to the timing when the gate of the FET 403 is turned ON, or from the time when the gate of the FET 403 is turned OFF to the time when the diode 404 is turned OFF.

Figure 5:
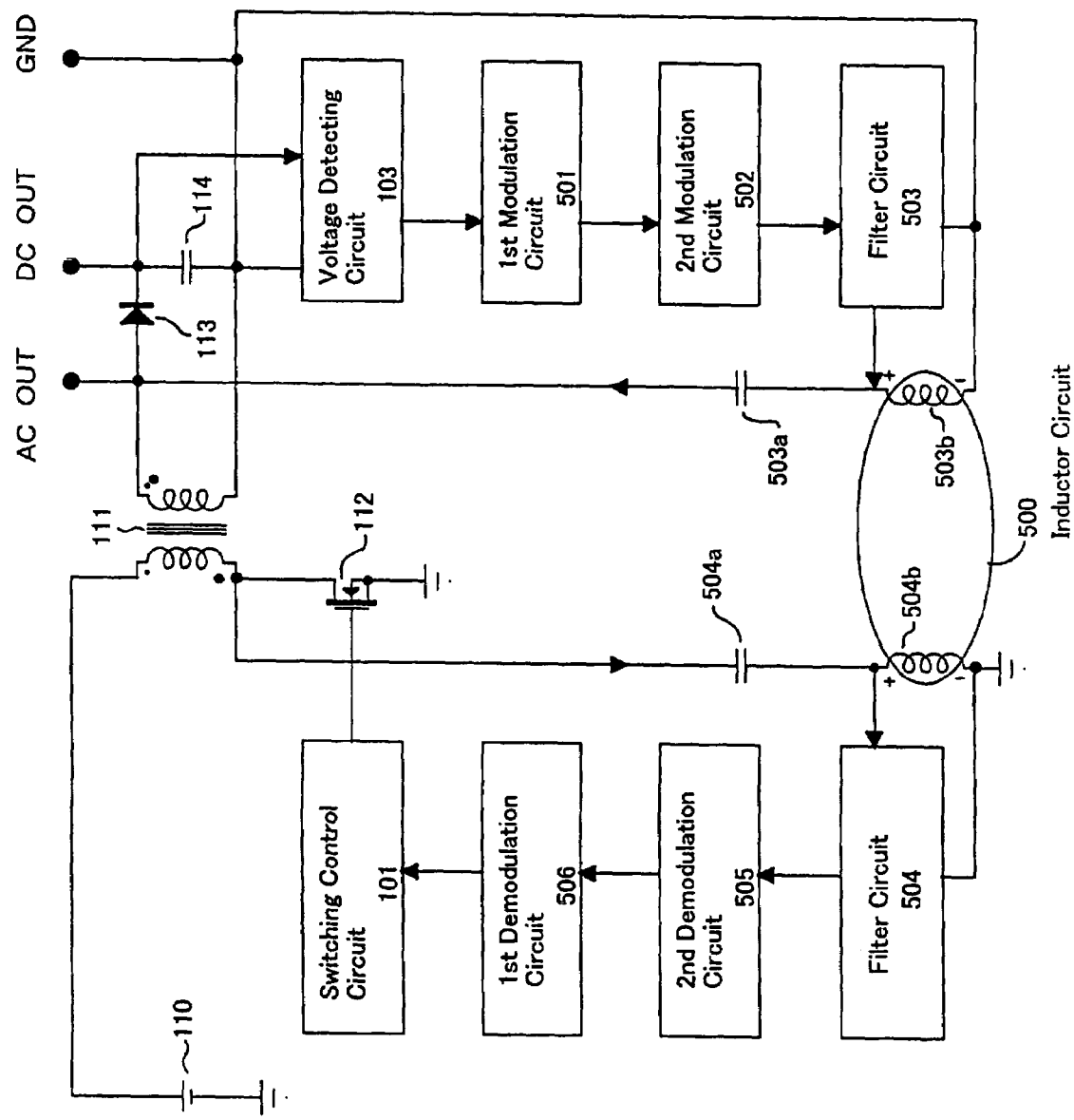
FIG. 5 is a circuit diagram depicting a construction of the fourth embodiment according to the present invention.

FIG. 5 is a circuit diagram representing a construction of the fourth embodiment according to the invention. In the fourth invention, the switching control signal is modulated with a frequency which is different from the switching frequency.

As shown in FIG. 5, in the fourth embodiment, the output of the secondary side is modulated twice and the double modulated signal is sent to the primary side; on the primary side the transferred modulated signal is demodulated twice. That is to say, a voltage on the secondary side detected by the voltage detecting circuit 103 is AM modulated with a frequency of, for instance, about 15 kHz in the first modulating circuit 501 and then FM modulated in the second modulating circuit 502 with a frequency of about 10 MHz. The output of the second modulating circuit 502 is sent to the primary coil of the transformer 111 via a filter circuit 503, a capacitor 503*a* and the secondary coil of the transformer 111.

On the primary side, the output of the primary coil of the transformer 111 is supplied to the second demodulating circuit 505 via a capacitor 504*a* and a filter circuit 504; then FM demodulated in the second demodulating circuit 505 and then supplied to the first demodulating circuit 506 to be AM demodulated. The output of the first demodulating circuit 506 corresponds to the output voltage on the secondary side. The switching control circuit 101 controls the switching element 112 in accordance with the output voltage of the first demodulating circuit 506, so that the operation of the element 112 becomes more correct.

It should be noted that the output of the capacitor 503*a* on the secondary side may be transferred to the primary side via the tertiary coil provided on the secondary side of the transformer 111, or may be transferred via the fourth coil which is further provided on the primary side of the transformer 111. The apparatus also may be arranged to modulate and demodulate only once, as shown in FIG. 2 or 3.

When the output on the secondary side is modulated with a high frequency, which is different from the switching frequency, the modulated output would have a nature like a radio wave. Therefore, even when the distance between the modulating circuit and the demodulating circuit is large, the control signal could be preferably transferred. In this case, an inductor circuit as shown by the numerical reference 500 in FIG. 5 can be preferably used as the transferring means. The inductor circuit 500 is composed of a micro inductor 503*b* which is provided on the output side of the filter circuit 503; and a micro inductor 504*b*, which is provided on the input side of the filter circuit 504; a leaked magnetic flux generated in this circuit 500 may be used to transfer the modulated output to the primary side. In this case, the modulating frequency, which is about 10 times of the switching frequency or more, is preferably used to modulate the modulated signal on the secondary side.

The photo-coupler shown in FIG. 2 can be substituted with the inductor circuit 500 to transfer the output on the secondary side to the primary side.

Figure 6:
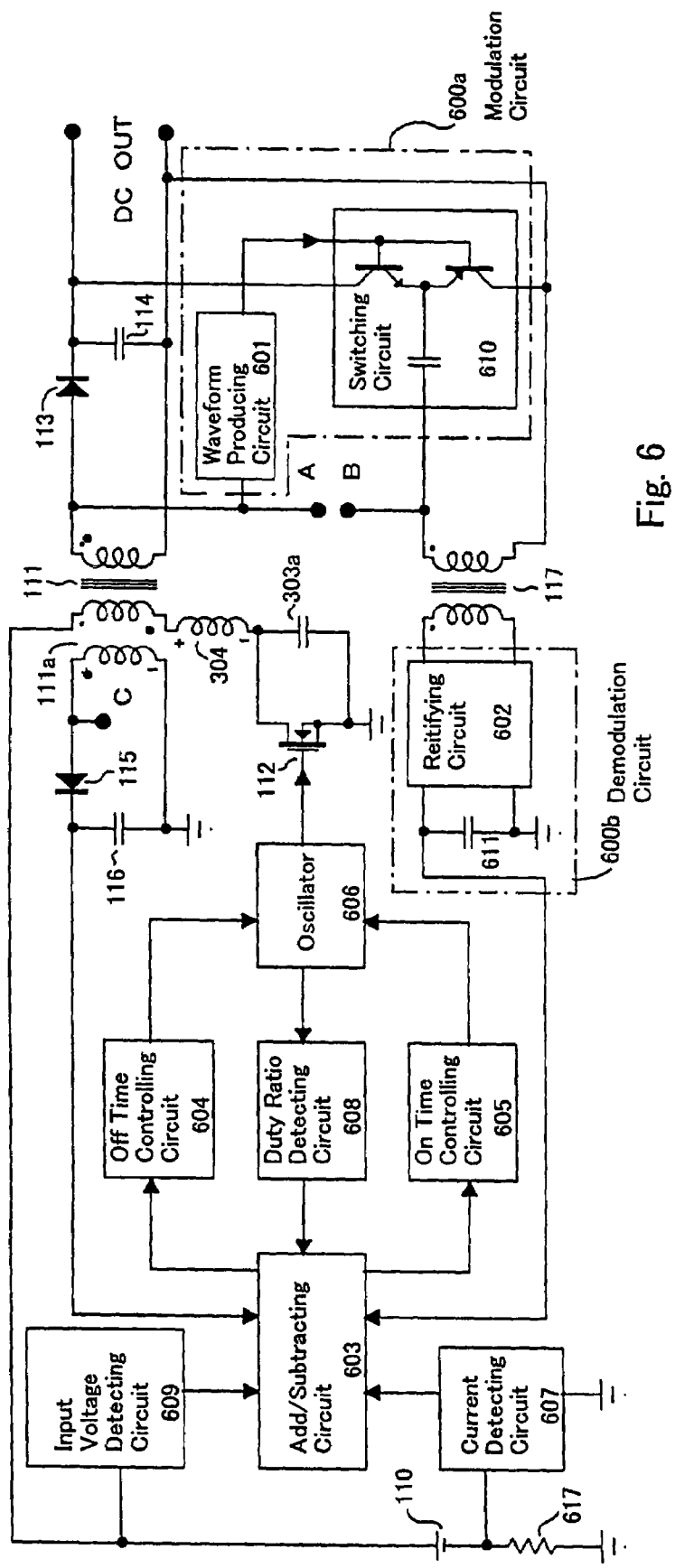
FIG. 6 is a circuit diagram depicting constructions of the fifth and sixth embodiments according to the present invention, respectively.

FIG. 6 is a circuit diagram showing the fifth embodiment of the present invention. In the fifth embodiment, a second transformer 117 is provided separately from the switching transformer 111 to transfer the modulated signal on the secondary side to the primary side.

More concretely, on the secondary side of the transformer 111, a modulation circuit 600*a*, which is composed of a waveform producing circuit 601 and a switching circuit 610, is arranged; in the modulation circuit 600*a*, a pulse amplitude modulated signal is produced in accordance with the output of the secondary side; the modulated signal is transferred to the primary side via the second transformer 117. On the primary side, a demodulation circuit 600*b*, which is composed of a rectifying circuit 602 and a smoothing circuit 611 is provided, to demodulate the output of the second transformer 117, so that the operation of the switching element 112 is controlled by the demodulated signal.

The switching circuit 610 in the modulation circuit 600*a* obtains the DC output on the secondary side of the transformer 111 and drives the voltage appearing on the secondary side (left side in the drawing) of the second transformer 117. The driving signal of the switching circuit 610 is supplied there from the secondary coil of the first transformer 111 via the waveform producing circuit 601. As a result, a pulse voltage on the secondary side of the first transformer 111, which is almost proportional to the output voltage, is supplied to the secondary side of the second transformer 117. This pulse voltage is sent to the primary coil of the second transformer (left side in the drawing), then rectified in the rectifying circuit 602 and smoothed by the smoothing capacitor 611, and then demodulated. Therefore, the demodulated signal is also proportional to the direct output voltage of the first transformer 111.

In case that the required specification is not so strict, it may be possible to arrange such that the waveform generating circuit 601 and the switching circuit 610 are omitted and the points A and B in FIG. 6 are directly connected so as to directly supply the output of the first transformer 111 to the second transformer 117. Rough controlling is available even only using the demodulated signal supplied from the demodulating circuit 600*b*, i.e. a signal from the rectifying circuit 601 and the smoothing circuit 611.

Next, a sixth embodiment according to the present invention will be explained. In the sixth embodiment, a load regulation correcting circuit and/or a line regulation correcting circuit is/are provided on the primary side to obtain a high performance.

The load regulation correcting circuit will be explained first. When load current increases, the output voltage decreases. In such a case, a load regulation should be corrected. In the sixth embodiment, a current detecting circuit 607 is provided to detect an input current of the apparatus; the detected input current is supplied to the add and subtracting circuit 603, where the detected input current is subtracted from the output of the demodulating circuit 600*b*. The output of the circuit 603 is further modulated with the aid of an ON time controlling circuit 605 to control the output of an oscillator 606. The load regulation can be corrected by increasing ON time of the switching element 112 in this manner.

In FIG. 6, the input current is detected such that an electric current going through the registrant 617, which is provided between the input power supply 110 and GND, is taken off by the detecting circuit 607. This may be altered by a time constant detecting circuit 608 provided between the adding and subtracting circuit 603 and the oscillator 606, where the duty ratio of the output of the oscillator 606, because the duty ratio represents the input current. Further, a signal obtained by normalizing the output of the oscillator, by, for example, a registrant and a capacitor, can also be used. It should be noted that the registrant 617 can be inserted at the source side of the switching element 112 to detect the input current therefrom.

Next, a correction for line regulation will be explained. When the input voltage is high, the output voltage also becomes high. In such a case, appropriate correction for line regulation is required. In the sixth embodiment, an input voltage detecting circuit 609 is provided at the downstream side of the input power supply to detect the input voltage; the detected input voltage is added to the output of the demodulating circuit 600b in the adding and subtracting circuit 603. The output of the circuit 603 is modulated in the OFF time controlling circuit 604 to control the operation of the switching element 112.

Instead of the direct detection of the input voltage with the aid of the input voltage detecting circuit 609, the voltage, for example, obtained by rectifying the output of tertiary coil 111a of the first transformer 111 in a forward mode may be used. Any circuit which decreases the duty ratio of the switching element 112 when the power supply voltage becomes high can be used for detecting the input voltage.

The correction for load regulation and line regulation can be applied to control the OFF time of the switching element. That is to say, in a voltage resonate converter, the OFF time of the switching element is constant, however, the optimum OFF time varies depending upon the load current or the input voltage. Therefore, when the variation of the OFF time is corrected in accordance with the input current, time constant, or input voltage, a wider load current and wider input voltage condition can be obtained and therefore more proper resonating operation can be realized.

Further, when the apparatus is arranged as a voltage resonating converter, the tertiary coil 111a of the first transformer 111, i.e. the voltage at the point C, is detected to predict the timing when the voltage of the switching element 112 becomes zero, and then the ON time of the switching element 112 can be controlled by assuming that the predicted timing is the terminated end signal of the OFF time of the switching element 112. It may be possible to add said duty ratio correcting means.

Furthermore, it should be noted that when the above-mentioned correction for load regulation and/or line regulation is conducted, a preferable specification may be obtained by the arrangement such that the demodulation circuit of the switching frequency, which is composed of the diode 115 and the capacitor 116, is connected to the tertiary coil 111a of the transformer 111 and then the switching element 112 is controlled by the output of the demodulation circuit. It should be noted that there is no modulation circuit on the secondary side. However, the operation itself of the switching element 112 is a sort of modulation, therefore, the circuit composed of the diode 115 and the capacitor 116 is called as a demodulation circuit here.

It should also be noted that the operation in the modulation circuits, the demodulation circuits and the correcting circuits (for load regulation and/or line regulation) mentioned above can be carried out by using DSP (Digital Signal Processing) technique. Moreover, the modulation method is not limited, so that any one selected from an amplitude modulation, frequency modulation, phase modulation, pulse width modulation, pulse frequency modulation, pulse amplitude modulation, pulse period modulation, pulse code modulation, spread spectrum modulation, quadrature modulation, or a mixture of these modulation methods can be preferably used.

Figure 7:
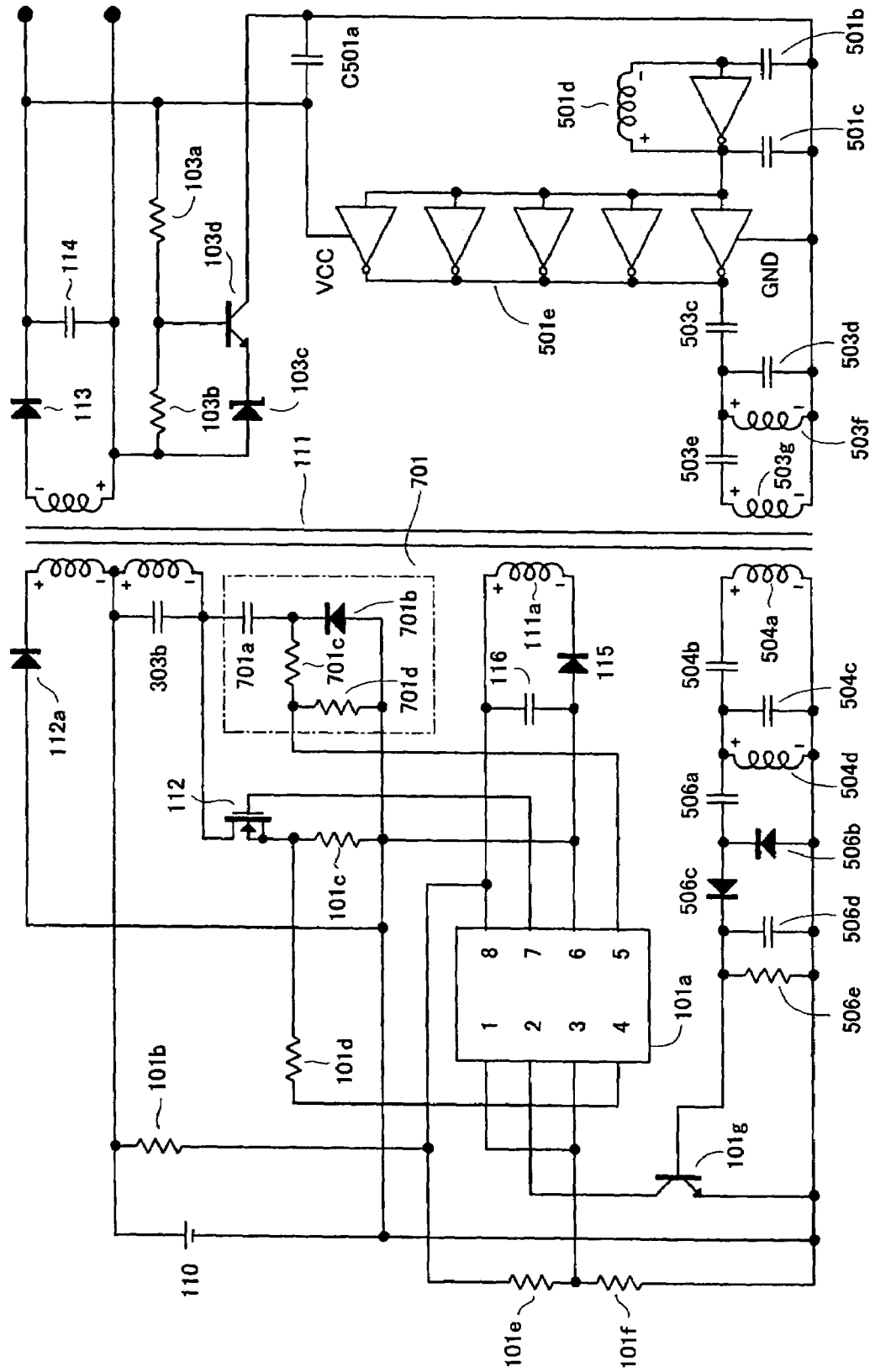
FIG. 7 is a circuit diagram showing a construction of the sixth embodiment of the present invention.

FIG. 7 is a circuit diagram showing a construction of the sixth embodiment of the power supply apparatus according to the invention. In the sixth embodiment, a voltage resonate type converter is shown. ICs (UC3861~UC3834 (manufactured by Texas Instruments)), are developed exclusively for voltage resonate type converters, which are arranged such that the Off time is fixed while the On time is controlled. However, in order to control the apparatus in the best mode, it is actually required to control the switching means so as to make the Off time little longer when the load is light, while the Off time little shorter when the load is heavy.

The sixth embodiment of the present invention provides an apparatus where an IC, which is developed for improving the power factor in a quasi-resonating mode operation, is used with a special arrangement so that the IC works suitably for voltage resonate type converters. In the sixth embodiment, FA5500 (manufactured by FUJI Electric) is used, however, the below listed ICs can also be used for this purpose.

NJM 2375 (new JRC)
FAN7527 (Fairchild)
MC34261 (ON semiconductor)
TDA4862 (SIEMENS)
L6560 (ST Microelectronics)

These ICs work similarly to FA5500 including the PIN's arrangement.

The detail explanation of the function of the above-mentioned ICs is omitted here, however, the necessary function is: after the ZCD (Zero Current Detect) terminal ($5^{th}$ PIN) changed from high to low and then a predetermined time period has been passed the OUT terminal ($7^{th}$ PIN) becomes high. This does not cause any problem in the quasi-resonating type converters.

In the sixth embodiment, the IC (FA5500) 101a is provided and a network circuit 701 (capacitor 701a, diode 701b, registers 701c and 701d) is inserted between the switching element 112 and GND as shown in FIG. 7, so that the timing when the drain voltage of the switching element 112 becomes very close to 0V is detected by the network circuit 701. In case, for instance, that the resister 701c is 2.4 MΩ and the resister 701d is 100 kΩ, when the drain voltage becomes down to 33.25V, which is 25 times of the threshold voltage of the ZCD terminal, i.e. 1.33V, the ZCD signal is detected by the network circuit 701. The time delay caused in the IC 101a is added to the ZCD signal and then turn the OUT terminal ($7^{th}$ PIN) high.

Thereby, the switching element operates almost in a ZVS manner, which is more suitable for the resonate type converters, than keeping the Off time constant. As a result, in the sixth embodiment of the present invention, the apparatus works in such a manner that the Off time is little longer when the load is light while the Off time becomes little shorter when the load is heavy, so that an excellent switching control can be carried out covering a whole range.

In the network circuit 701, it looks like that even if the capacitor 701a is short and the diode 701b is open, the circuit works in the same manner. However, this type of ICs do not start up under the condition that a voltage higher than the threshold voltage is applied to the ZCD terminal at the time of starting up; therefore the capacitor 701a and the diode 701b are necessary to start up the IC. It is the first aspect of the sixth embodiment of the present invention that the drain voltage of the switching element 112 is detected to obtain a ZCD signal and the capacitor 701a and the diode 701b are provided to realize an AC coupling.

In the ICs for use in quasi-resonate type converters, a control signal is normally supplied to FB terminal ($1^{st}$ PIN). However, in this way, the gain becomes too large and thus the feedback operation is apt to be unstable. In order to overcome this problem, in the sixth embodiment of the present invention, the control signal is supplied to the $2^{nd}$ PIN, which is an output of an amplifier and an input of a multiplier and inherently for connecting a capacitor in order to make the response delay. This is the second aspect of the sixth embodiment of the present invention.

It should be noted that a fixed voltage is applied to the $3^{rd}$ PIN, which is an input of the multiplier, however, the connection of the $2^{nd}$ and $3^{rd}$ PINs can be exchanged to obtain the same operation.

For the occasion that an over-voltage is caused, it is preferred to have a function to stop the OUT signal from the $7^{th}$ PIN. Therefore, in the sixth embodiment, the FB terminal ($1^{st}$ PIN), which is inherently used for a feedback operation, carries it on. That is to say, it is arranged that a divided voltage of VCC voltage, divided by the resisters 101e and 101f, is applied to the FB terminal, so that the 1$^{st}$ PIN works such that when a voltage more than 1.09 times of 2.5V is applied, it judges that an over-voltage is caused stops the output signal. This is the third aspect of the sixth embodiment of the present invention.

The diode 112a constitutes a clamping circuit with the winding of the transformer 111 being connected to a cathode side of the diode 112a. The clamping circuit is provided in order not to apply an over-voltage to the FET 112. The circuit construction is similar to the reset circuit of forward converters, however, the clamping circuit here does not work when the apparatus is normally working. This is the fourth aspect of the sixth embodiment of the present invention.

As stated above, by modifying the ICs, which are developed for quasi-resonate type converters can be obtained, a suitable operation for the voltage resonate type converters. In this case, the timing when the drain voltage of the switching element becomes very close to 0V is detected and then making the switching element ON at the best timing. It should be noted that such ICs that are newly developed for this purpose may be used.

Figure 8:
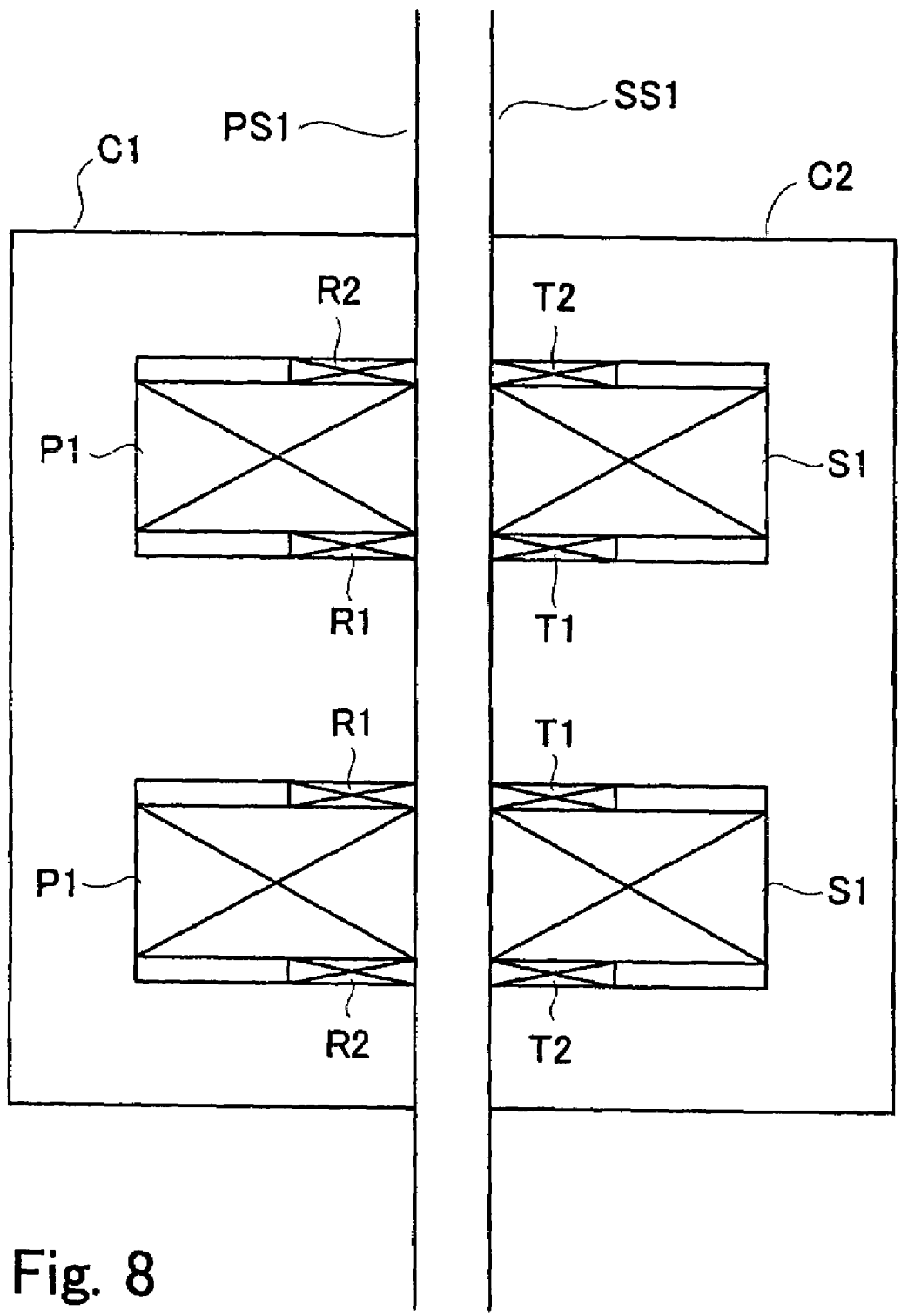
FIG. 8 is a schematic view showing a construction of the transformer used in the present invention.

FIG. 8 is a schematic view showing a construction of the transformer used in the present invention. EE type cores C1, C2 are used here, where the transmitting windings T1, T2 and the receiving windings R1, R2 are provided being closer to the cores C1 than the primary side winding P1 and the secondary side winding S1, respectively. Further, the transmitting windings T1, T2 and the receiving windings R1, R2 are provided in the vicinity of the surfaces PS1 and SS1, respectively, which are imaginary formed by extending the surfaces of the arms of the cores C1, C2. The first transmitting winding T1 and the first receiving winding R1, and the second transmitting coil T2 and the second receiving coil R2, are provided to face each other with respect to the imaginary surfaces PS1 and PS2, respectively. According to the above-mentioned arrangement of the windings, the coupling between the transmitting windings and the receiving windings become better so that the transmitting power can be saved. Therefore, the influence to EMI noise can be decreased and the power consuming, particularly when the load is light, can be reduced.

Further, in the non-contacted type transformer, where the coupling degree is not so high, a leakage magnetic flux becomes large, which makes an eddy current with a conductive member in the magnetic field of the leakage current, if any. In order to avoid the loss of the eddy current, a Litz wire (not shown) is effective. The Litz wire is important for the primary and secondary windings P1 and S1, which have a large volume.

It should be noted that the above-mentioned arrangement of the windings can be applied to UU type cores.

Furthermore, the embodiments explained above use a direct electric power supply 110, however, the present invention can be applied to AC-DC converters where an alternative output is rectified and smoothed.

Figure 9:
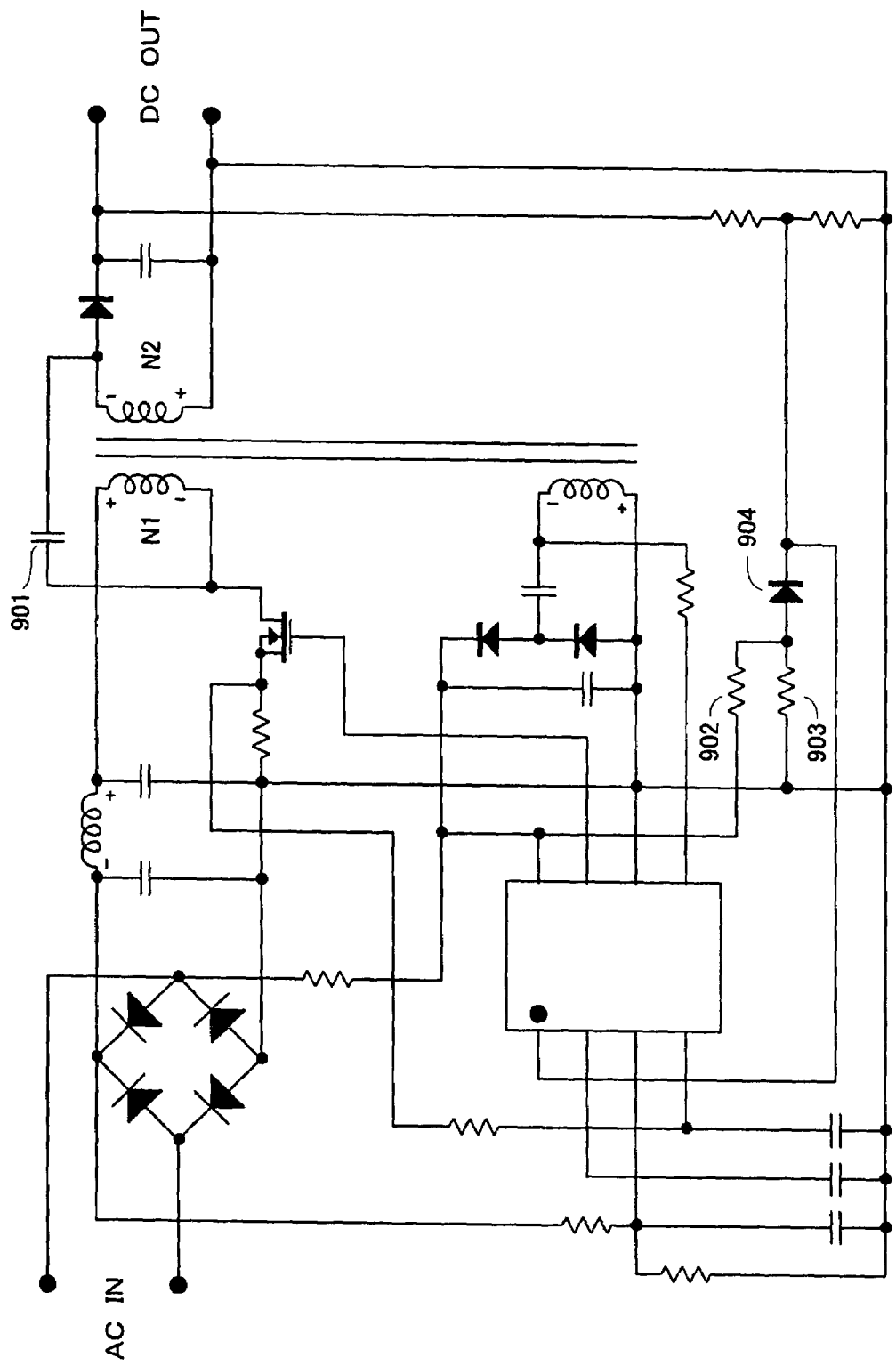
FIG. 9 is a circuit diagram showing a construction of the seventh embodiment of the present invention.

In order to widen the range of input voltage to avoid the harmonics in AD-DC converters, it is effective to provide a PFC converter as shown in FIG. 9 in the front stage of the power supply apparatus. In the circuit shown in FIG. 9, a PFC operation is realized in a fly-back converter. This has an advantage in that the output voltage does not become so high, in comparison to the apparatus where a PFC is realized in a boost converter. Therefore, an FET having a break-down voltage of 600V and a low ON resister can be used. Further, in this embodiment, the surge voltage is effectively avoided by the arrangement that the ratio of the primary winding N1 and the secondary winding N2 of the transformer is one to one (1:1) and a capacitor 901 is provided.

The control IC, FA5500 is operated in a quasi-resonate manner, where the 1$^{st}$ PIN is not started up with the voltage of 0.3V or less. This does not matter for boost converters, however, the IC is not started up in fly-back converters. In the seventh embodiment of the present invention, resisters 902 and 903 and a diode 904 are added to divide the VCC voltage and the thus divided voltage is supplied to the FB terminal via the diode 904; this arrangement makes the voltage of the 1$^{st}$ PIN 0.3V or more. Since the circuit constant is determined such that the diode 904 is biased in a reversed manner after starting up the circuit, the added elements, i.e. resisters 901 and 903 and the diode 904 do not effect after the IC is started up.

As explained above, according to the present invention, a highly precise switching control can be realized in switching power supply apparatus where the power is transferred from the primary side to the secondary side in an isolated manner. That is to say, the output on the secondary side can be made correctly to appear on the primary side. Even when a photo coupler is used to return the output on the secondary side to the primary side, the signal is not apt to be influenced by dirt adhering on the surface of the photo coupler or the variation per hour of the photo coupler itself. Further, it is not necessary to provide any starting up circuit. Furthermore, even when the switching control is conducted without modulation on the secondary side, the highly precise control can be obtained by appropriately correcting the line regulation and/or the load regulation.

Isolated type converters are explained in the above-mentioned embodiments, however, it should be noted that the present invention can be applied to contacted type converters, where, for example, a flange is provided to divide a bobbin into two (primary and secondary bobbins), which causes a large leakage inductance as well.

What is claimed is:

1. An isolated type switching power supply apparatus which comprises a power supply, a transformer connected to said power supply and comprising a core including primary and secondary sides having primary and secondary windings, respectively, and a switching means for switching an electric current going through the primary winding of said transformer so that an energy generated on the primary side of said transformer is sent to the secondary side in accordance with the operation of said switching means, the apparatus further comprising:
    a modulating means for modulating an output on the secondary side of said transformer;
    a transmitting means for transmitting an output of said modulating means through the core of the transformer from the secondary side to the primary side of said transformer;
    a demodulating means for demodulating the output transmitted by the transmitting means; and
    a switching means controlling circuit for controlling said switching means, wherein the operation of said switching means is controlled in accordance with an output of said demodulating circuit.

2. The apparatus of claim 1, wherein said modulating means includes at least one of a first modulating circuit and a second modulating circuit, wherein each of the first and second modulating circuits includes at least one of amplitude modulation, frequency modulation, phase modulation, pulse width modulation, pulse frequency modulation, pulse amplitude modulation, pulse period modulation, pulse code modulation, spread spectrum modulation and orthogonal modulation capabilities for further modulating the output of said modulating circuit; and
    wherein said demodulating means includes at least one of a first demodulating circuit and a second demodulating circuit for demodulating the output of said modulating circuit modulated by at least one of the first and second modulating circuits and transmitted by said transmitting means.

3. An isolated type switching power supply apparatus which comprises a power supply, a transformer connected to said power supply and including primary and secondary sides, a switching means for switching an electric current going through a primary winding of said transformer so that an energy generated on the primary side of said transformer is sent to the secondary side in accordance with the operation of said switching means, the apparatus further comprising:

a modulating means for modulating an output on the secondary side of said transformer;

a transmitting means including a photo-coupler and for transmitting an output of said modulating means through the photo-coupler from the secondary side of said transformer to the primary side of said transformer;

a demodulating means for demodulating the output transmitted by the transmitting means; and a switching means controlling circuit for controlling said switching means, wherein the operation of said switching means is controlled in accordance with an output of said demodulating means.

4. The apparatus of claim 3, wherein said modulating means includes at least one of a first modulating circuit and a second modulating circuit, wherein each of the first and second modulating circuits includes at least one of amplitude modulation, frequency modulation, phase modulation, pulse width modulation, pulse frequency modulation, pulse amplitude modulation, pulse period modulation, pulse code modulation, spread spectrum modulation and orthogonal modulation capabilities for further modulating the output of said modulating circuit; and wherein said demodulating means includes at least one of a first demodulating circuit and a second demodulating circuit for demodulating the output of said modulating circuit modulated by at least one of the first and second modulating circuits and transmitted by said transmitting means.

5. An isolated type switching power supply apparatus which comprises a power supply, a transformer connected to said power supply and comprising a core including primary and secondary sides having primary and secondary windings, respectively, and a switching means for switching an electric current going through a primary winding of said transformer so that an energy generated on the primary side of said transformer is sent to the secondary side in accordance with the operation of said switching means, the apparatus further comprising:

an FET for rectifying an output of the secondary winding of said transformer;

a modulating means for generating a pulse width modulated driving signal for said FET at an output, wherein the output of said modulating means is transmitted from the secondary side to the primary side through the core of said transformer;

a demodulating means for demodulating the transmitted output at the primary side; and a switching means controlling circuit for controlling operation of said switching means, wherein said operation of said switching means is controlled in accordance with an output of said demodulating means.

6. The apparatus of claim 5, wherein the modulating means modulates a timing difference between a driving timing of said FET and a switching timing of said switching means.

7. An isolated type switching power supply apparatus which comprises a power supply, a first transformer connected to said power supply and having primary and secondary sides, and a switching means for switching an electric current going through a primary winding of said first transformer so that an energy generated on the primary side of said first transformer is sent to the secondary side of said first transformer in accordance with the operation of said switching means, the apparatus further comprising:

a second transformer having primary and secondary sides;

a pulse amplitude modulating means for modulating an output of said second transformer at a same frequency as a switching frequency of said switching means in accordance with an output of said power supply apparatus;

a transmitting means for transmitting an output of said pulse amplitude modulating means through said second transformer from the secondary side of the second transformer to the primary side of the second transformer;

a demodulating means for demodulating the output transmitted by said transmitting means; and a switching means controlling circuit for controlling the operation of said switching means, wherein said operation of said switching means is controlled in accordance with an output of said demodulating means.

8. The apparatus of claim 7 further comprising:

at least one of (i) a load regulation correcting means for detecting an input electric current of said apparatus and correcting a load regulation of the apparatus in accordance with the detected input electric current, and (ii) a line regulation correcting means for detecting an input voltage of said apparatus and correcting a line regulation of the apparatus in accordance with the detected input voltage.

9. An isolated type switching power supply apparatus which comprises a power supply, a transformer connected to said power supply and having primary and secondary sides, and a switching means for switching an electric current going through a primary winding of said transformer so that an energy generated on the primary side of said transformer is sent to the secondary side in accordance with the operation of said switching means, the apparatus further comprising:

a tertiary winding at the primary side of said transformer;

a rectifying means for rectifying an output of said tertiary winding;

a switching means controlling circuit for controlling the operation of said switching means, wherein said switching means controlling circuit controls the operation of said switching means in accordance with the output of said rectifying means; and at least one of (i) a load regulation correcting means for detecting an input electric current of said apparatus and correcting a load regulation of the apparatus in accordance with the detected input electric current, and (ii) a line regulation correcting means for detecting an input voltage of said apparatus and correcting a line regulation of the apparatus in accordance with the detected input voltage.

10. The apparatus of claim 9, wherein the detection of said input electric current in the load regulation correcting means is performed by detecting a duty ratio of said switching means.

* * * * *